Dec. 15, 1953  F. D. SAWYER  2,662,783
BUSH AND BOG HARROW
Filed Sept. 21, 1951
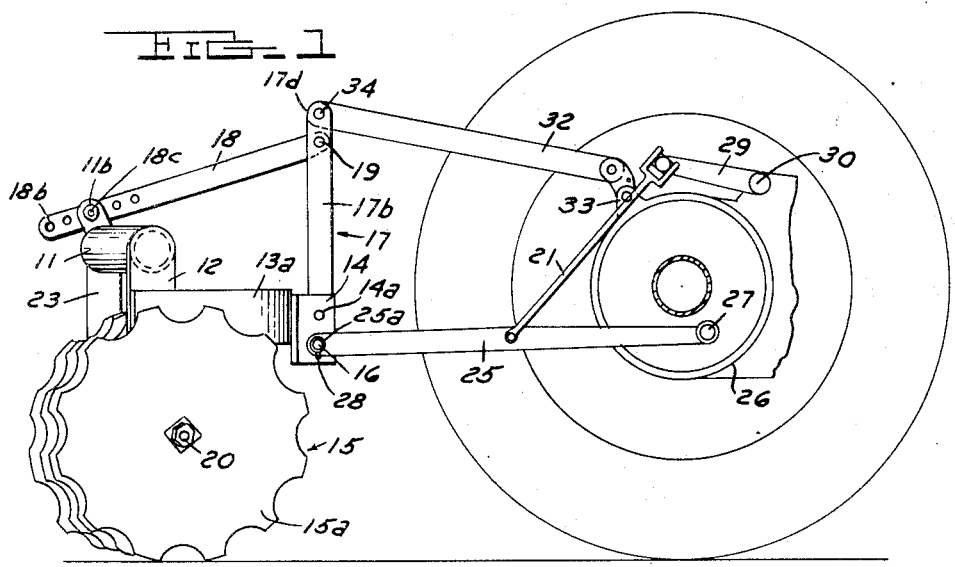
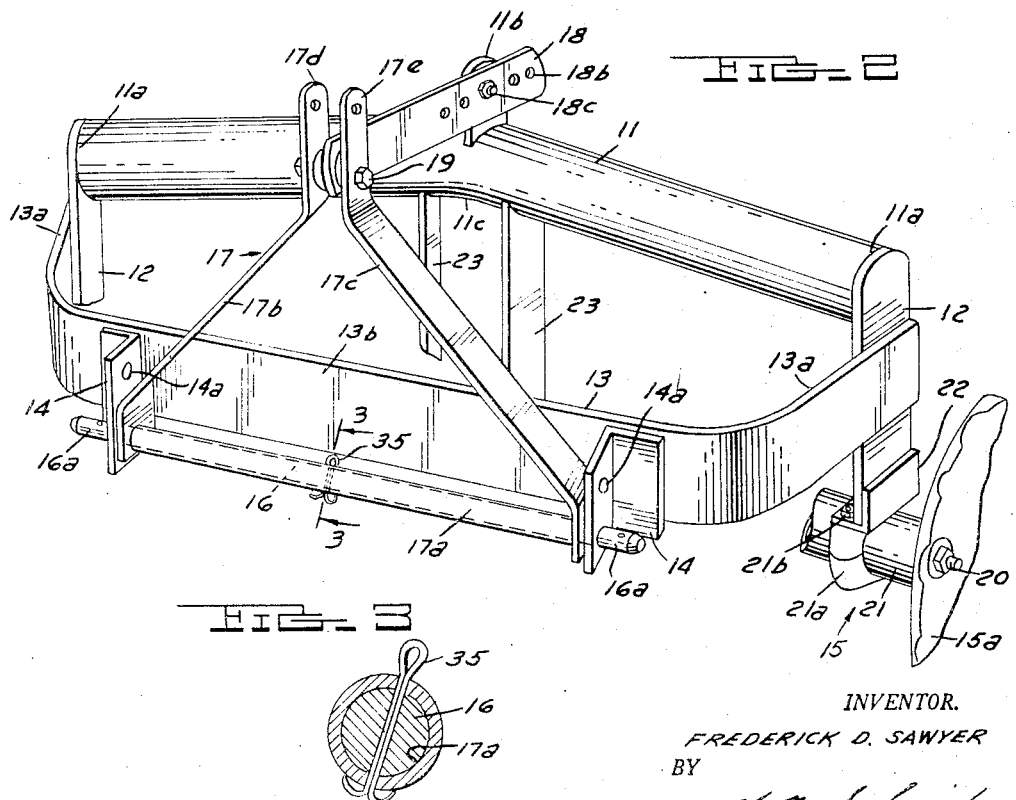
INVENTOR.
FREDERICK D. SAWYER
BY
*Wm. Schaich*
ATTORNEY Patented Dec. 15, 1953

2,662,783

UNITED STATES PATENT OFFICE 2,662,783

BUSH AND BOG HARROW

Frederick D. Sawyer, Wayne, Mich., assignor to Dearborn Motors Corporation, Birmingham, Mich., a corporation of Delaware Application September 21, 1951, Serial No. 247,597

1 Claim. (Cl. 280—461)

This invention relates to an improved implement hitch and particularly a hitch for connecting the so-called "lift type" implements to a well-known type of tractor having three laterally and vertically spaced, power-lifted hitch links.

The connection of various farm implements to a well-known type of tractor having a pair of laterally spaced, power-lifted hitch links and a centrally disposed top link has heretofore been conventionally accomplished by providing a pair of laterally projecting pins on the frame of such implement adapted respectively to connect to the two lower hitch links, and providing an upstanding frame structure on the implement defining at its top a pivotal connection to the free end of the tractor top link. Such hitching arrangement is generally integral with or rigidly bolted to the implement, the A-frame in particular being welded to the frame structure of the implement. When it is considered that there are a large variety of implements usable with this type of tractor, and that all of such implements have heretofore incorporated substantially identical hitching structures, it becomes apparent that there are definite advantages residing in the provision of a hitch frame structure which may be conveniently attached to any one of a plurality of different implements and thus avoid the duplication of providing a hitch structure on each implement. Furthermore, there is always a need for providing the most economical form of a hitch frame structure for any individual implement.

Accordingly, it is an object of this invention to provide an unusually simple, economically manufacturable hitch structure for an implement to adapt such implement for connection to a tractor of the type having laterally and vertically spaced, power-lifted hitch links.

Still another object of this invention is to provide a hitch frame structure for "lift type" implements which may be selectively and conveniently applied to any one of a plurality of different types of implements, thereby eliminating the necessity of each implement having a hitch frame integrally associated therewith.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevational view of an implement incorporating a hitch frame constructed in accordance with this invention, shown in assembled relationship to the rear end of a tractor.

Figure 2 is an enlarged detail perspective view of the hitch frame and implement frame detached from the tractor.

Figure 3 is an enlarged detail cross sectional view taken along the plane 3—3 of Figure 2.

As shown on the drawings:

As was indicated above, the hitch frame embodying this invention may be conveniently applied to any one of a plurality of different types of farm implements, such as plows, disc harrows, cultivators, rotary hoes, weeders, planters, etc. All of such implements conventionally embody a main frame structure comprising a pair of longitudinally spaced, transversely disposed members. This invention will be particularly described and illustrated in connection with this application to a disc harrow of the type more fully described and claimed in my co-pending application, Serial No. 203,185, filed December 28, 1950. Such disc harrow comprises a main transverse frame member 11 of solid bar stock bent into an angular or V-construction corresponding to the desired working angle of a pair of disc gangs 15 which are mounted beneath such bar as will be later described. The ends 11a of member 11 are squared off perpendicular to the axes of such ends and a pair of depending plate-like arms 12 are respectively conveniently secured by welding to the squared off ends 11a of bar 11. Depending arms 12 are utilized to support the outer ends of the pair of disc gangs 15. Each disc gang 15 comprises the usual disc blades 15a mounted in axially spaced relationship by suitable spacers (not shown) on a shaft or gang bolt 20. Adjacent the ends of each gang bolt 20, a bearing 21 (only one of which is shown) is provided which surrounds the end portions of each of such gang bolts. Bosses 21a are provided on each of the bearings 21 and a pair of vertically disposed bolts 21b in such bosses secure the bearing caps of bearing 21 about the gang bolt 20 in a well-known manner and such bolts likewise secure an angle lug 22 to the top of each boss 21a.

Depending arms 12 are respectively welded at their lower ends to the angle lugs 22 provided on the outermost ends of disc gangs 15. A pair of vertical depending arms 23, which also comprise plate-like members, are respectively welded at their upper ends to the underside of bar member 11 on opposite sides of the vertex 11c. The lower ends of arms 23 are respectively welded to the innermost angle lugs 22 provided on the inner bearings 21 (not shown) of the disc gangs 15.

A horizontally disposed, substantially U-shaped bracket 13 is provided having rearwardly diverging arms 13a which are respectively welded to a medial portion of the depending arms 12. Such arms diverge somewhat, as shown in Figure 4, to facilitate securing the ends thereof to the depending arms 12. The bight portion 13b of bracket 12 is forwardly facing, as best shown in Figures 1 and 2. A pair of transversely spaced angle lugs 14 are welded to the forwardly facing bight portion 13b of bracket 13, as best shown in Figure 4. Additionally, an upstanding lug 11b is welded to the top of the vertex portion 11c of the V-shaped bar member 11.

Those skilled in the art will recognize that a large number of other types of implements are conventionally provided with longitudinally spaced, transverse frame members such as V-shaped bar member 11 and the bracket 13. In the application of this invention to any one of such plurality of implements, the forward transverse frame member is also provided with the transversely spaced lugs 14 while the rear transverse frame member is provided with a lug similar to the upstanding lug 11b.

In accordance with this invention, a hitch frame 17 is provided comprising a generally triangular structure having a tubular element 17a forming its base portion and a pair of upstanding inwardly sloped side members 17b and 17c. The top ends of side members 17b and 17c are bent to define laterally spaced vertical end portions 17d and 17e between which one end of a brace link 18 is mounted as by a bolt 19. A plurality of transverse holes 18b are provided in longitudinally spaced relationship in the lower end of brace 18, whereby such link may be secured to the lug 11b on the implement as by a bolt 18c traversing such lug and a selected hole 18b. Thus, the effective length may be conveniently varied. The width of the bottom portion of the triangular hitch frame 17 is proportioned so as to fit snugly between the forwardly projecting lugs 14. Lugs 14 are respectively provided with aligned apertures 14a and the hitch frame 17 is secured to such lugs by passing a rod 16 through the apertures 14a and the bore of the tubular element 17a. The rod 16 is of such length so that its ends 16a respectively project beyond the lugs 14 and such ends 16a are suitably shaped so as to mount the trailing ends of the tractor hitch links 25 thereon, as will be presently described.

In order to prevent lateral shifting of the inserted rod 16 with respect to the hitch frame, a suitable transverse hole is drilled through both the tubular element 17a and the inserted rod 16 and a cotter pin 35 is inserted therein. The hitch frame embodying this invention is utilized for the connection of implements to a tractor of well-known make having a pair of laterally spaced, draft links 25 pivoted to the rear axle housing 26 as at 27. The trailing ends of draft links 25 are provided with a universally swiveling spherical joint connection 25a which are respectively mountable on the ends of rod 16. A suitable linch pin 28 secures the draft links 25, when mounted on rod 16, against displacement. Draft links 25 are vertically raised by a pair of transversely spaced rocker arms 29 secured to the ends of a rock shaft 30 mounted on top of the tractor transmission housing. The ends of rocker arms 29 are respectively connected to a pair of links 21 which are in turn connected to a medial portion of draft links 25 whereby draft links 25 are lifted. A top link 32 is pivotally connected at its forward end to a lug member 33 provided on top of axle housing 26 while the rear end of top link 32 is pivotally connected between the upstanding end portions 17c of arm 17 by a transverse pin or bolt 34. Rocker arms 29 are rotated by a built-in hydraulic mechanism (not shown) and such mechanism is controlled by a manually operated hydraulic control lever, also not shown. Thus by manipulation of such lever the tractor operator can easily and conveniently raise or lower draft links 25 to raise the harrow to a transporting position or lower them and a connected implement to a ground engaging position.

Under some conditions, and with certain implements, it is desirable to effect a somewhat lower effective point of connection of the tractor hitch links 25 with the implement. This may be conveniently accomplished by providing additional holes 14a in the forwardly projecting lugs 14 in vertically spaced relationship. The hitch frame 17 may then be connected by the inserted rod 16 at any desired level with respect to the implement by suitable selection of the holes in the lugs 14 through which the rod 16 is passed.

From the foregoing description, it is obvious that the hitch frame 17 may be conveniently detached from the illustrated disc harrow and attached to another type of implement provided with attaching lugs similar to the lugs 14 and 11b. Hence the manufacturing cost of a large number of implements may be substantially reduced by designing them to mount the hitch frame structure embodying this invention.

It will, of course, be understood that various details of construction may be varied through a wide range without departing from the principles of this invention and it is, therefore, not the purpose to limit the patent granted hereon otherwise than necessitated by the scope of the appended claim.

I claim:

A hitch for connecting an implement to a tractor having a pair of laterally spaced, trailing lower hitch links and a vertically spaced trailing top link, comprising a pair of brackets adapted for connection to the implement in laterally spaced relationship, each of said brackets having a plurality of vertically spaced transverse holes therein respectively aligned with the holes of the other bracket, a vertically disposed, generally triangular, rigid hitch frame having a bottom tubular member insertable between said brackets, a rod freely inserted through a selected aligned pair of said holes and said tubular member, thereby pivotally securing said hitch frame to the implement at a selected vertical height relative to the implement, said rod having the ends thereof respectively projecting beyond said brackets and adapted for connection respectively to the lower tractor hitch links, an adjustable length brace element connected between the top portion of said hitch frame and the implement to rigidify said hitch frame and the implement, and means on the top portion of said hitch frame adapted for connection to the tractor top link.

FREDERICK D. SAWYER.

References Cited in the file of this patent

UNITED STATES PATENTS

| Number | Name | Date |
|---|---|---|
| 1,566,831 | Clement | Dec. 22, 1925 |
| 1,727,262 | Wolfe | Sept. 3, 1929 |
| 1,807,379 | Burrows | May 26, 1931 |
| 1,848,359 | Krause | Mar. 8, 1932 |
| 1,880,075 | Davis | Sept. 27, 1932 |
| 2,341,807 | Olmstead | Feb. 15, 1944 |
| 2,456,693 | Fraga | Dec. 21, 1948 |
| 2,532,637 | Newkirk | Dec. 5, 1950 |
| 2,575,622 | Fraga | Nov. 20, 1951 |

FOREIGN PATENTS

| Number | Country | Date |
|---|---|---|
| 359,433 | Great Britain | Oct. 19, 1931 |